(12) United States Patent
Schwarz

(10) Patent No.: US 12,013,670 B2
(45) Date of Patent: Jun. 18, 2024

(54) MONITORING A LASER MACHINING PROCESS USING DEEP FOLDING NEURAL NETWORKS

(71) Applicant: Precitec GmbH & Co. KG, Gaggenau (DE)

(72) Inventor: Joachim Schwarz, Kleinandelfingen (CH)

(73) Assignee: Precitec GmbH & Co. KG, Gaggenau (DE)

( * ) Notice: Subject to any disclaimer, the term of this patent is extended or adjusted under 35 U.S.C. 154(b) by 407 days.

(21) Appl. No.: 17/295,904

(22) PCT Filed: Oct. 10, 2019

(86) PCT No.: PCT/EP2019/077485
§ 371 (c)(1),
(2) Date: May 21, 2021

(87) PCT Pub. No.: WO2020/104103
PCT Pub. Date: May 28, 2020

(65) Prior Publication Data
US 2022/0011726 A1 Jan. 13, 2022

(30) Foreign Application Priority Data
Nov. 22, 2018 (DE) .......................... 102018129441.7

(51) Int. Cl.
*G05B 13/02* (2006.01)
*G06N 3/08* (2023.01)
(Continued)

(52) U.S. Cl.
CPC ........... *G05B 13/027* (2013.01); *G06N 3/082* (2013.01); *G06T 7/0004* (2013.01)

(58) Field of Classification Search
CPC .... B23K 1/0056; B23K 26/032; B23K 26/21; B23K 26/38; B23K 31/006; B23K 31/125; G05B 13/027; G06N 3/082; G06T 7/0004
See application file for complete search history.

(56) References Cited

U.S. PATENT DOCUMENTS 9,105,077 B2    8/2015    Wersborg
10,635,081 B2    4/2020    Nakahama
(Continued)

FOREIGN PATENT DOCUMENTS

CN          1384772 A    12/2002
CN       108346151 A     7/2018
(Continued)

OTHER PUBLICATIONS

International Search Report dated Jan. 27, 2020; International Application No. PCT/EP2019/077485.

*Primary Examiner* — Michael J Vanchy, Jr.
(74) *Attorney, Agent, or Firm* — DINSMORE & SHOHL LLP

(57) ABSTRACT

A system for monitoring a laser machining process for machining a workpiece includes a computing unit configured to determine an input tensor on the basis of current data of the laser machining process and to determine an output tensor on the basis of the input tensor using a transfer function. The output tensor contains information on a current machining result. The transfer function between the input tensor and the output tensor is formed by a trained neural network.

14 Claims, 9 Drawing Sheets

(51) Int. Cl.
*G06N 3/082* (2023.01)
*G06T 7/00* (2017.01)

(56) References Cited

U.S. PATENT DOCUMENTS

| | | | |
|---|---|---|---|
| 10,649,435 B2 | 5/2020 | Shindou | |
| 11,536,669 B2* | 12/2022 | Schwarz | ............... B23K 26/38 |
| 2015/0001196 A1 | 1/2015 | Kim et al. | |
| 2017/0032281 A1* | 2/2017 | Hsu | .................. G05B 19/41875 |

FOREIGN PATENT DOCUMENTS

| | | | |
|---|---|---|---|
| DE | 19957163 C1 * | 8/2001 | ............. B23K 26/03 |
| DE | 19957163 C1 | 8/2001 | |
| DE | 102017101223 A1 | 8/2017 | |
| DE | 102018001571 A1 | 9/2018 | |
| EP | 1145795 A2 | 10/2001 | |
| JP | 2018103284 A | 7/2018 | |
| JP | 2018138327 A | 9/2018 | |
| WO | 2010057661 A1 | 5/2010 | |
| WO | 2011009594 A1 | 1/2011 | |

* cited by examiner

MONITORING A LASER MACHINING PROCESS USING DEEP FOLDING NEURAL NETWORKS

CROSS-REFERENCE TO RELATED APPLICATIONS

This application is the U.S. National Stage of PCT/EP2019/077485 filed Oct. 10, 2019, which claims priority to German Patent Application No. 10 2018 129 441.7, filed Nov. 22, 2018, the entire content of both are incorporated herein by reference in their entirety.

FIELD OF THE INVENTION

The present disclosure relates to a system for monitoring a laser machining process for machining a workpiece and a machining system for machining a workpiece by means of a laser beam, said machining system including such a system for monitoring a laser machining process for machining a workpiece. The present disclosure further relates to a method for monitoring a laser machining process for machining a workpiece.

BACKGROUND AND PRIOR ART

In a machining system for machining a workpiece by means of a laser beam, the laser beam exiting from a laser light source or an end of a laser optical fiber is focused or collimated onto the workpiece to be machined by means of a beam guiding and focusing optics. The machining may include, for example, laser cutting, soldering or welding. The laser machining system may for example comprise a laser machining head.

In particular for laser welding or soldering a workpiece, it is important to continuously monitor the welding or soldering process and to ensure the quality of the processing. Current solutions for monitoring such laser machining processes usually include what is known as in-process monitoring.

In-process monitoring or monitoring of a laser machining process is typically carried out in that certain signals or parameters of the laser machining process, such as temperature values, plasma radiation, the laser power of the laser machining head, the amount and type of backscattered laser power, etc. are recorded and assessed independently of one another. For example, measured values of a signal or parameter are continuously measured or detected over a certain period of time in order to obtain a signal corresponding to the parameter. The geometry of the steam capillary (also called keyhole) and the melt pool surrounding the steam capillary are also monitored by means of image processing and evaluation during the laser machining process.

This is followed by processing and classifying the individual signals, for each of which a variety of setting values for filter processes, median or mean value calculations, envelope curves, threshold values, etc. must be set by an experienced specialist. When a signal is classified, the signal is examined as to whether the signal meets certain error criteria. For example, it is examined whether the signal falls below or exceeds predefined threshold values. For this purpose, the individual signals are compared with predefined reference curves around which so-called envelope curves have been placed. Another criterion may be, for example, the integral of the signal over the envelope curve.

If a signal meets predefined error criteria during the laser machining process, an error is output by the in-process monitoring. This means that the in-process monitoring generates a notification that a machining error has occurred.

The classification of the signals and the monitoring of the keyhole and melt pool geometry thus describe the quality of the laser machining process. Based on the classification of the signal or parameter curves and the monitoring of the keyhole and melt pool geometry, machining errors are detected and classified and depending thereon the machined workpiece is labeled or classified, for example, as "good" (i.e., suitable for further machining or sale) or as "bad" (i.e., as scrap). In addition, while the laser machining process is running, the control parameters of the process can be influenced via monitoring the signals or parameters or the geometry of the keyhole and melt pool geometry. The laser machining process can thus be controlled.

In conventional systems, the signal processing and classification is complex since the characteristics that describe the quality depend heavily on the material used, the applied laser power, the welding speed and much more. This means that the classification of the signals has to be adapted using numerous parameters. Adopting the laser machining to a new material or a change of the machining process requires a change of the classification parameters and the parameters of image processing. Every adjustment of the laser machining, for example due to a product change, requires the parameters to be set or readjusted again.

Due to that complexity, both the signal processing and the classification of the signals are performed separately for each signal or each parameter, that is, independently of the other signals or parameters. The setting of the parameters both for signal processing and for classification of the signals, for example the creation of the envelope curves, etc., and the image processing must therefore be carried out by specialists.

Which features of the signal or parameter curves or the keyhole and melt pool geometry can be used for monitoring the laser machining process and detecting machining errors can also only be decided and implemented by specialists in the field, since the complexity of these systems is very high due to the number of parameters to be set.

Accordingly, the training of specialists is complex and lengthy. In addition, the setting and readjustment of the parameters requires long production interruptions in the manufacture at the customers of the laser machining systems. In addition, the risk of incorrect parameterization is high.

In conventional systems, the laser machining system is therefore only monitored on the basis of individual signal or parameter curves and the monitoring of the keyhole and melt pool geometry. Thus, monitoring taking into account all signals or parameters of the laser machining process and taking into account the keyhole and melt pool geometry at the same time is not carried out.

FIG. 3A shows an exemplary signal representing the plasma radiation of a laser machining process, for example a welding process, and the signal of a temperature of the laser machining process within the respective envelope curves. Both signals are within the envelope such that the weld is classified as correct since the integral of the signal beyond the envelope is less than a defined threshold value.

In FIG. 3B, the signals are clearly above the respective envelope curves. With the corresponding parameterization of the threshold value for the integral beyond the envelope curve, the signal is classified as faulty and a machining error is detected.

FIG. 3C shows curves of three different signals. Each signal curve is individually classified as correct. In fact, however, there is a faulty weld. In order to recognize it, the curves of a plurality of signals would have to be used and, as the case may be, examined by a specialist.

SUMMARY OF THE INVENTION

It is an object of the invention to detect processing errors reliably and quickly and without complex parameterization processes. It is also an object of the invention to detect machining errors, preferably in real time, while the laser machining process is running.

In addition, it is an object of the invention to provide a system which automates the detection of machining errors and thus enables process monitoring, preferably in real time.

It is also an object of the invention to provide a system wherein the detection of machining errors can be adapted quickly and easily to changed circumstances or a changed situation, such as a changed machining process or a different workpiece material.

It is a further object of the invention to provide a system wherein the detection of machining errors is carried out while taking a large number of parameters into account.

Moreover, it is an object of the invention to provide a system wherein the detection of machining errors is carried out based on raw data recorded from a machining area on the workpiece surface (so-called "end-to-end" processing or analysis).

These objects are achieved by the subject matter disclosed herein. Advantageous embodiments and further developments are also disclosed.

The invention is based on the idea that the determination of the machining result of the laser machining process, in particular the detection of machining errors and the determination or characterization of the machining area, is carried out using a deep neural network which receives current sensor data, control data and/or image data of the laser machining process as input data, preferably as raw data.

According to an aspect of the present disclosure, a system for monitoring a laser machining process for machining a workpiece is provided, the system comprising: a computing unit configured to determine input tensors based on current data of the laser machining process and to determine an output tensor containing information about a current machining result based on said tensors by means of a transfer function, wherein the transfer function between the input tensors and the output tensor is formed by a taught neural network. The machining result may include information about a machining error and/or a machining area of the workpiece.

Accordingly, the system is able to independently and directly determine the machining result of the laser machining process. For example, it can be determined whether there is a machining error in a workpiece machined by the laser machining system. In addition, it can be determined whether a machining area of the workpiece has predetermined features or a predetermined geometry, for example whether a keyhole has been formed or what extent a melt pool has. Based thereon, parameters of the laser machining process can be set in order to avoid further errors. A laser machining process or a laser machining system can therefore be controlled using the system for monitoring.

In general, the use of a neural network forming the transfer function has the advantage that the system can autonomously detect whether and which machining errors are present. Hence, it is no longer necessary for the detected sensor data to be preprocessed in order to be accessible for error detection. Furthermore, it is not necessary to define error criteria that characterize the machining quality or indicate any machining errors. It is also not necessary to specify or adapt a parameterization of the error criteria. This simplifies the monitoring of a laser machining process. The steps mentioned do not have to be carried out or attended by experts in laser machining. The system for monitoring a laser machining process according to the aspects disclosed herein carries out the detection of machining errors and the determination of the keyhole and melt pool geometry independently, i.e. automatically, and can be easily adapted.

With the output tensor, the system may therefore include information about a current machining result of the current monitoring area, such as about a condition of the machining area itself, for example an extent of the machining area, the presence of a so-called keyhole or steam capillary, the presence of a melt pool, a position and/or depth of the keyhole within the melt pool, an extent or shape of the melt pool, etc.

Furthermore, the system may be able to detect a machining error and indicate its type. The output tensor may contain, for example, at least one of the following pieces of information: presence of at least one machining error, the type of the machining error, probability of a machining error of a certain type, position of the machining error on a surface of a machined workpiece. The type of machining error may be at least one of the following: pore, hole, lack of welding penetration through the workpiece, false friend, spatter or gap.

The computing unit may thus be configured to determine the output tensor for the current machining area of the laser machining process while the laser machining process is still running. The direct determination of the machining result may make it possible to monitor the laser machining process in real time. The computing unit may be configured to form the output tensor in real time and to output control data to a laser machining system carrying out the laser machining process. In the simplest case, the output tensor may contain the information as to whether the machining of a workpiece is good or bad. Based on this information, the laser machining process may be controlled accordingly by adapting process parameters, for example. For example, laser power may be increased or reduced, the focus position of the laser may be changed, or a distance between the machining head of a laser machining system and the workpiece may be changed.

The transfer function between the input tensor and the output tensor is formed by a taught or trained neural network. In other words, the computing unit may include a neural network. The neural network may have been trained by error feedback or backpropagation.

The neural network may be a taught deep neural network, e.g. a taught deep convolutional neural network or convolutional network. The convolution network may have between 10 and 40 convolution layers, preferably 34 convolution layers. In addition, the convolution network may have at least one so-called "fully connected" layer.

The neural network can be configured for transfer learning. In other words, the neural network can be adapted to changed requirements of a changed laser machining process. The computing unit may in particular be configured to adapt the neural network to a changed laser machining process by means of transfer learning, e.g. based on training data.

The training data may include test data of the changed laser machining process for determining a corresponding input tensor and a predetermined output tensor which is associated with the test data and contains information about a corresponding previously determined machining result of the changed laser machining process. The machining result may include information about a machining error identified, for example, by an expert. To adapt or train the neural network, the training data may include a plurality of sets of such test data and associated output tensors. The test data may be based on values of a sensor parameter that have been detected by at least one sensor unit during a previous laser machining process and/or on values of a control parameter that have been used during a previous laser machining process.

Thus, the neural network forming the transfer function can be adapted to a changed situation or a changed laser machining process. Fort this purpose, the transfer function is modified. The changed situation may include, for example, that the workpieces to be machined have different materials, different degrees of soiling and/or thicknesses, or that the parameters of the laser machining change. In transfer learning, a training data set used for training or teaching the neural network or a reduced training data set may be supplemented with new examples.

The use of a trained neural network configured for transfer learning in the system for detecting machining errors according to the aspects described herein thus has the advantage that the system can be quickly adapted to changed situations.

The input tensors may include or consist of current data of the laser machining process as raw data. Accordingly, the current data do not have to be processed before the input tensor is created. A data processing step preceding the formation of the input tensor may thus be omitted. The neural network determines the output tensor directly on the basis of the raw data.

The computing unit may be configured to incorporate a multitude of current data of the machining process corresponding to the same current point in time in the input tensor and to jointly map them to the output tensor by means of the transfer function. Due to the simultaneous processing of all relevant current data of the laser machining process, the determination of the machining result can be done more reliably and fast. This allows for the laser machining process to be monitored more reliably and precisely.

The input tensors may include current data of the laser machining process, which include acquired sensor data and/or control data, which include, for example, 512 samples, each sample being associated with a point in time. The sensor data and control data are also referred to as process data below. The input tensor is formed from the respective current data by laying a window over 512 samples every 256 samples. This ensures an overlap in the samples between two input tensors created successively. An image can be captured for each sample, wherein the image can be associated with the respective sample of the sensor data and/or control data via the point in time of the image capture. Accordingly, each input tensor may contain data such as, for example, sensor data, image data and/or control data of the machining process that correspond to the respective point in time. That is, the sensor data or image data were recorded at the respective point in time and the control data were applied to the machining process at the respective point in time by a control unit of the laser machining system. The input tensors generated in this way may comprise the last n acquired sensor data and/or the last n acquired image data and/or the last n used control data for a given point in time during the execution of the laser machining process. In the simplest case, n=1.

According to an embodiment, n=512 and a first input tensor comprises current sensor and/or control data, in other words current process data, and a second input tensor comprises current image data. That is, the first input tensor comprises the last 512 samples or values of the respective sensor data, control data and/or image data. With a typical sampling rate of 100 kHz, a data set of dimensions m×512 is generated every 5.12 ms. Here, m stands for the number of m different types of data which comprise the (acquired) sensor data and the (received or used) control data. The first input tensor of dimension m×512 is formed from these data sets every 2.56 ms. With a corresponding image acquisition rate of approx. 391 images/s (i.e. an image is recorded every 2.56 ms), a second input tensor of the image data may be generated with every first input tensor of the process data. For example, an image with 512×512 pixels is acquired corresponding to an input tensor of the current process data. Accordingly, the correspondingly generated input tensor of the image data has the dimension 512×512 in this case.

The current sensor data may include one or more temperatures, plasma radiation, intensities of reflected or back-scattered laser light at different wavelengths, a keyhole depth and/or a distance between a laser machining head performing the laser machining process and the workpiece. The control data may include an output power of a laser on the laser machining head, a focus position, a focus diameter, a position of the laser machining head, a machining speed and/or a path signal. The image data may include an image of a surface of the workpiece, for example an image of a machining area of the workpiece. The machining area can include a melt pool and/or a keyhole.

The path signal may be a control signal of a laser machining system carrying out the laser machining process, said path signal controlling a movement of a laser machining head relative to the workpiece. By including the path signal in the determination of the machining signal, a machining error that has occurred can, for example, be quickly and easily localized on the workpiece, since it is known at which point in time which area of the workpiece is or has been machined by the laser machining system. The system may thus be able to indicate the point in time at which an error occurred during the laser machining process. Alternatively, the system may calculate the point in time based solely on the known machining speed, a known point in time as a defined starting point and the temporal mapping of the input tensors. The temporal mapping of the input tensors results from the generation rate of the input tensors and a number of input tensors generated since the starting point.

Furthermore, the system may comprise at least one sensor unit for detecting current sensor data of the laser machining process during the laser machining process. The sensor data detected by the sensor unit thus represent values of a parameter detected or measured by the sensor unit, for example a physical parameter such as a temperature. The at least one sensor unit may comprise a temperature sensor, a light sensor or a plasma sensor. The sensor unit may further comprise a distance sensor, for example a triangulation system and/or an OCT ("optical coherence tomography") system. The distance sensor may be used to determine a distance to a surface of the workpiece, e.g. a distance between a laser machining head of the laser machining system and the workpiece surface.

Furthermore, the system may comprise at least one image detection unit for detecting current image data of a machining area of the workpiece during the laser machining process. The image detection unit may comprise a camera or a camera system, in particular a 2D and/or 3D camera system, preferably with incident-light LED lighting. The image detection unit may comprise a stereo camera system. The image data preferably correspond to a two-dimensional image or a two-dimensional imaging of a section of a workpiece surface including the machining area of the laser machining process. The machining area may include a so-called melt pool and keyhole. In other words, the image data may include an image of the melt pool and the keyhole.

The acquisition rates of the image detection unit and the sensor unit may be the same. In other words, the data of the image detection unit and the sensor unit may be correlated for each predefined period of time. The image detection unit and the sensor unit may always acquire the respective data at the same points in time. For example, the image detection unit may record an image of the workpiece at those points in time at which a temperature sensor takes a temperature measurement.

The current data of the laser machining process may include current sensor data and/or current image data and/or current control data of the laser machining process. The sensor data and control data are also referred to as process data below. The sensor data represent values of at least one parameter detected or measured by a sensor unit. The control data represent values of at least one control parameter of the laser machining process or laser machining system.

The computing unit preferably includes at least one interface configured to receive said current data. The at least one interface may, for example, be configured to receive training data for training or adapting the neural network, control data of a laser machining system and/or sensor data of a sensor unit and/or image data from an image detection unit. Thus, the system may be configured to receive values of at least one control parameter from a control of a laser machining system carrying out the laser machining process, for example via an interface.

The network architecture for classifying the sensor data is typically different from the network architecture for classifying the image data.

According to an embodiment, in order to use image and process data at the same time, the respective neural networks classifying process data and image data are interconnected after the last or penultimate hidden layer. The feature representation of the input tensors of the image and process data is located in the last hidden layer of the respective network. The classification of these connected features takes place in the following fully connected layers.

This procedure has the advantage that only a few layers have to be trained when training the overall network and, during use restricted only to process data, the network that was trained for the process data can be used again. The networks for image and process data are trained separately for this procedure. The networks have thus learned the mapping of the input tensor consisting of the image data and the input tensor consisting of the process data onto feature vectors.

The input tensor(s) may contain current data for x past points in time during execution of the laser machining process, where x is a natural number, and, for each of the x points in time, the input tensors may include image data corresponding to this point in time and sensor or control data, i.e. process data. The points in time x may be equidistant from one another, for example 256 ms or 512 or 1024 ms respectively. The input tensor(s) may be mapped from the transfer function to the output tensor, that is, image data and control or sensor data are processed by a common transfer function.

According to an embodiment, two branches of the network are passed and the features of the respective input tensors are connected in one layer. One branch of the network has the image data, the other branch of the network has the process data as an input tensor. This approach is referred to as a so-called "feature level fusion". Both networks can easily be decoupled again and used individually, because the combination of image and process data in a tensor may not be effective in some situations.

According to a further aspect of the disclosure, a laser machining system for machining a workpiece by means of a laser beam is provided, said machining system comprising a laser machining head for radiating a laser beam onto a workpiece to be machined and a system for detecting a machining error according to one of the aspects described herein. The detection unit is preferably arranged on the laser machining head.

According to a further aspect, a method for monitoring a laser machining process for machining a workpiece is provided, the method comprising the steps of: determining one or more input tensors based on current data from the laser machining process, and determining an output tensor based on the one or more input tensors using a transfer function, wherein the output tensor contains information about a current machining result, wherein the transfer function between the input tensor and the output tensor is formed by a taught neural network.

BRIEF DESCRIPTION OF THE DRAWINGS

The invention is described in detail below with reference to figures. In the figures.

DETAILED DESCRIPTION OF THE PREFERRED EMBODIMENT

Unless otherwise noted, the same reference symbols are used hereinafter for elements that are the same and have the same effect.

Figure 1:
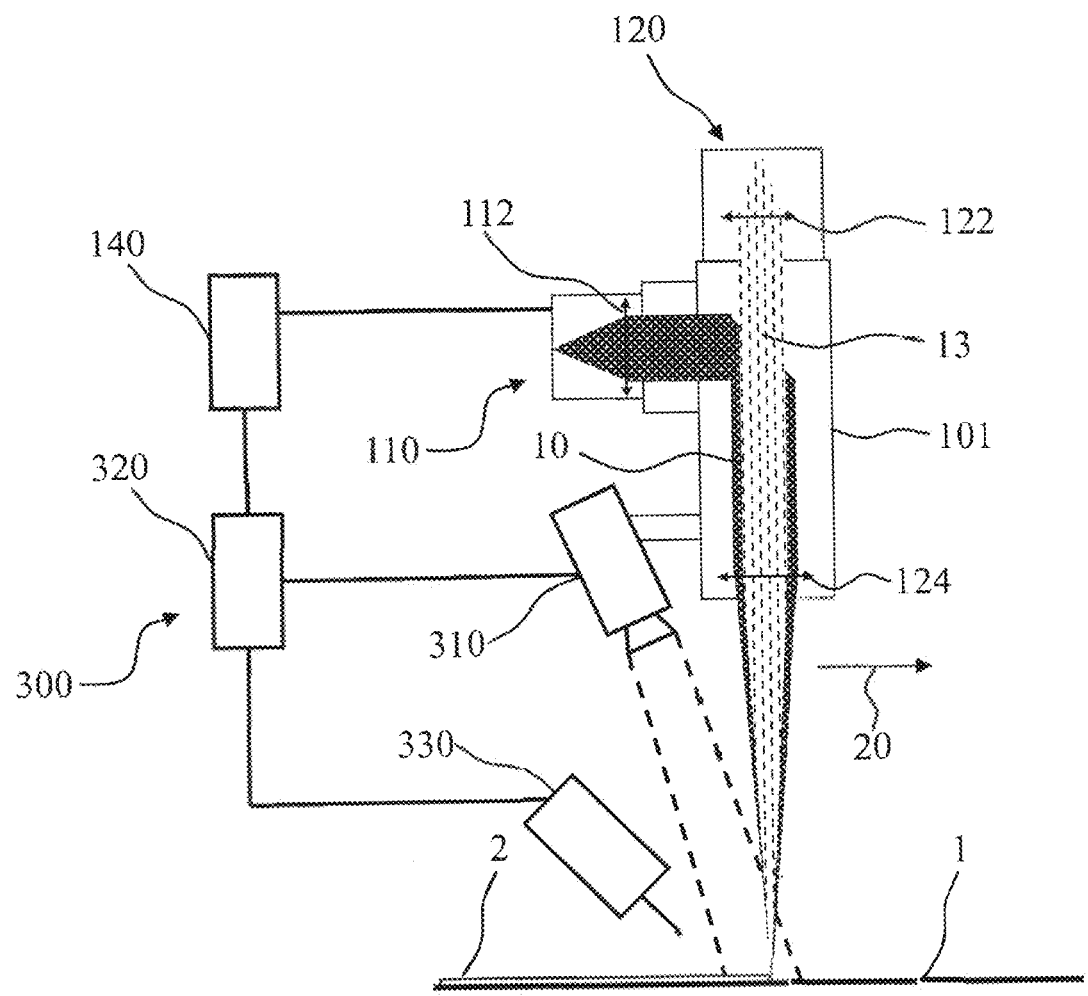
FIG. 1 shows a schematic diagram of a laser machining system for machining a workpiece by means of a laser beam and a system for detecting machining errors according to an embodiment.

FIG. 1 shows a schematic diagram of a laser machining system 100 for machining a workpiece by means of a laser beam according to embodiments of the present disclosure. The laser machining system 100 is configured to carry out a laser machining process according to embodiments of the present disclosure.

The laser machining system 100 comprises a laser machining head 101, in particular a laser cutting, laser soldering or laser welding head, and a system 300 for detecting machining errors. The laser machining system 100 comprises a laser apparatus 110 for providing a laser beam 10 (also referred to as a "machining beam" or "machining laser beam").

The laser machining system 100 or parts thereof, such as, for example, the machining head 101, may be movable along a machining direction 20 according to embodiments. The machining direction 20 may be a cutting, soldering or welding direction and/or a movement direction of the laser machining system 100, such as the machining head 101, with respect to the workpiece 1. In particular, the machining direction 20 may be a horizontal direction. The machining direction 20 may also be referred to as a "feed direction".

The laser machining system 100 is controlled by a control unit 140 configured to control the machining head 101 and/or the laser apparatus 110.

The system 300 for monitoring a laser machining process comprises a computing unit 320. The computing unit 320 is configured to determine an input tensor based on current data of the laser machining process and to determine an output tensor containing information about a current machining result of the laser machining process based on the input tensor using a transfer function.

In other words, the output tensor may be the result of one or more arithmetic operations and contain information about whether and which errors occurred when the workpiece 1 was machined by the laser machining system 100. Furthermore, the output tensor may contain information about the type, position and size of the error(s) on the workpiece surface 2. The output tensor may also contain information about a machining area of the workpiece 1, for example a size, shape or extent of a keyhole and/or a melt pool.

According to an embodiment, the computing unit 320 is combined with the control unit 140 (not shown). In other words, the functionality of the computing unit 320 may be combined with that of the control unit 140 in a common processing unit.

According to an embodiment, the system 300 further comprises at least one sensor unit 330 and an image detection unit 310.

The at least one sensor unit 330 is configured to detect the value of a parameter of a laser machining process carried out by the laser machining system 100, to generate sensor data from the detected values and to transmit them to the computing unit 320. The detection may take place continuously or in real time. According to an embodiment, the sensor unit 330 may be configured to detect values of a plurality of parameters and to forward them to the computing unit 320. The values may be detected at the same time.

The image detection unit 310 is configured to detect image data of a machined surface 2 of the workpiece 1 and/or of a machining area of the laser machining process. The machining area may be defined as an area of the workpiece surface where the laser beam 10 hits the workpiece surface at a current point in time and the material of the workpiece surface has melted and/or where a puncture or piercing hole is present in the material. In particular, the machining area may be defined as an area of the workpiece surface where a melt pool and/or a keyhole is formed. According to an embodiment, the image detection unit 310 is arranged on the machining head 101. For example, the image detection unit 310 may be arranged downstream on the machining head 101 with respect to the machining direction 20. The image detection unit 310 may also be arranged coaxially with a laser beam 10 and/or a measuring beam 13 described later. The computing unit 320 is configured to receive the image data detected by the image detection unit 310 and the sensor data detected by the sensor unit 330 and to form the input tensor on the basis of the current image data and the current sensor data.

Optionally, the laser machining system 100 or the system 300 comprises a measuring device 120 for measuring a distance between an end portion of the machining head 101 and a workpiece 1 to be machined. The measuring device may comprise an optical coherence tomograph, in particular an optical low-coherence tomograph.

The laser apparatus 110 may include a collimator lens 112 for collimating the laser beam 10. The coherence tomograph may include a collimator optics 122 configured to collimate an optical measuring beam 13 and a focusing optics 124 configured to focus the optical measuring beam 13 onto the workpiece 1.

Figure 2:
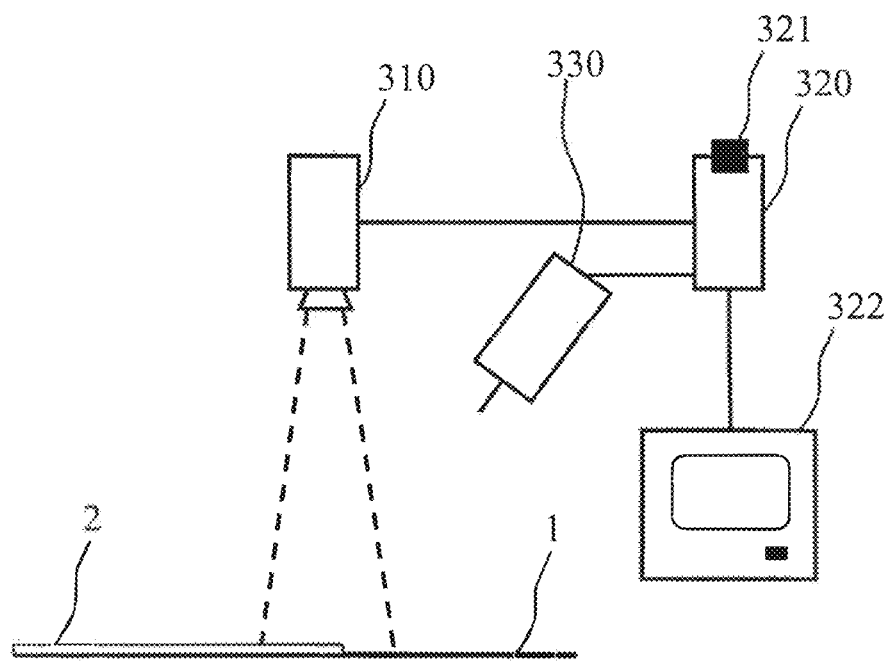
FIG. 2 shows a block diagram of a system for monitoring a laser machining process according to an embodiment.

FIG. 2 shows a block diagram of the system 300 for monitoring a laser machining process according to an embodiment.

The system 300 comprises the computing unit 320, at least one sensor unit 330 and an image detection unit 310. The computing unit 320 is connected to the sensor unit 330 and the image detection unit 310 so that the computing unit 320 can receive the image data detected by the image detection unit 310 and the sensor data detected by the sensor unit 320.

According to an embodiment, the computing unit 320 includes a processor for determining the output tensor. The transfer function is typically stored in a memory (not shown) of the computing unit 320 or implemented as a circuit, for example as an FPGA. The memory may be configured to store further data, for example the determined output tensor.

The computing unit 320 may include an input/output unit 322, which may in particular include a graphical user interface for interacting with a user. The computing unit 320 may include a data interface 321 via which the computing unit can transmit the output tensor to an external location, such as a further computing unit, computer, PC, an external storage unit, such as a database, a memory card or hard drive. The computing unit 320 may further include a communication interface (not shown) with which the computing unit can communicate with a network. Furthermore, the computing unit 320 may graphically display the output tensor on the output unit 322. The computing unit 320 may be connected to a control unit 140 of a laser machining system 100 in order to transmit the output tensor to the control unit 140.

The computing unit 320 may further be configured to receive control data from the control unit 140 of the laser machining system 100 via the interface 321 and also to incorporate the control data into the input tensor. The control data may include, for example, the output power of the laser device 110, the distance between the machining head 101 and the surface of the workpiece 1, the feed direction and speed, each at a given point in time.

The computing unit 320 forms one or more input tensors for a transfer function from the current data. According to the invention, the one or more input tensors are formed from current raw data. This means that the current data are not processed beforehand by the computing unit 320, the sensor unit 330 or the image detection unit 310.

The transfer function is formed by a taught, i.e. pre-trained, neural network. In other words, the computing unit includes the deep convolutional neural network. The output tensor is created by applying the transfer function to the one or more input tensors. Using the transfer function, the output tensor is thus determined from the one or more input tensors.

The output tensor contains information or data about a current machining result of the laser machining process. The machining result may, for example, include machining errors that have occurred and/or the information about a machining area of the workpiece. Said information about a current machining error may include: whether there is at least one machining error, the type of the at least one machining error, the position of the machining error on the surface of the machined workpiece 1 and/or the size or extent of the machining error. The information about the machining area may be: location and/or size of the keyhole, location and/or size and/or geometry of the melt pool. According to an embodiment, the output tensor may also contain the probability that a machining error of a certain type has occurred or the confidence that the system has detected a machining error of a certain type.

The image detection unit 310 may comprise a camera system or a stereo camera system, for example with incident-light LED lighting. According to the invention, the image data correspond to a two-dimensional image of a section of the workpiece surface. In other words, the detected or recorded image data represent a two-dimensional image of the workpiece surface, as shown by way of example in FIG. 4 and described in detail below.

Figure 3A:
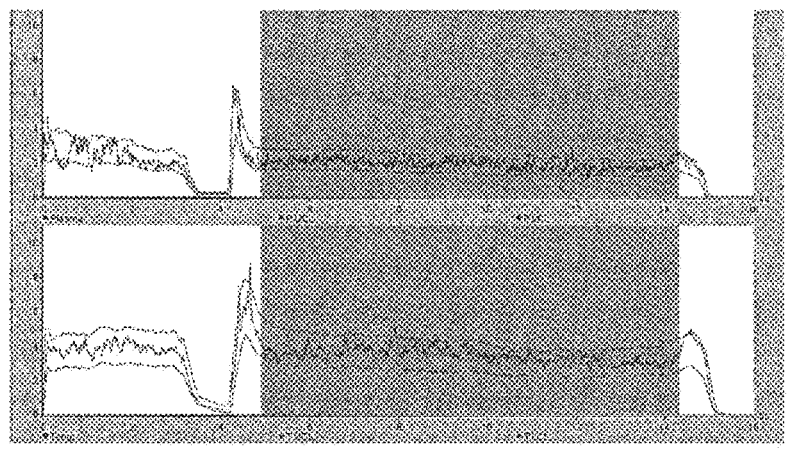
FIGS. 3A, 3B and 3C show illustrations of exemplary sensor value curves.
Figure 3B:
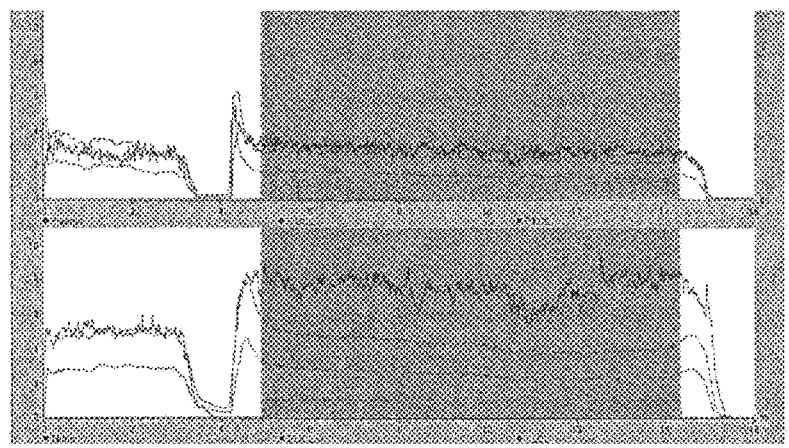
Figure 3C:
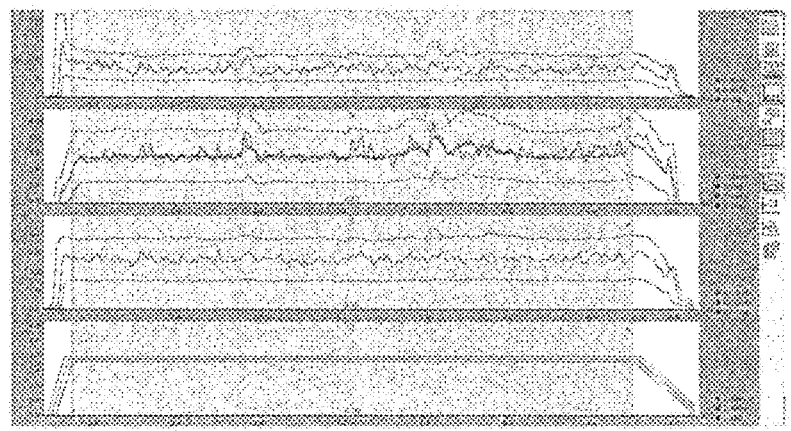

According to an embodiment, the computing unit 320 may be configured to graphically display the input tensor and/or the output tensor on the output unit 322. For example, the computing unit 320 may graphically display the sensor data and/or image data contained in the input tensor as curves, as shown in FIGS. 3A to 3C, or as two-dimensional images of the workpiece 1, as shown in FIG. 4, and superimpose these with the information contained in the output tensor.

Figure 4:
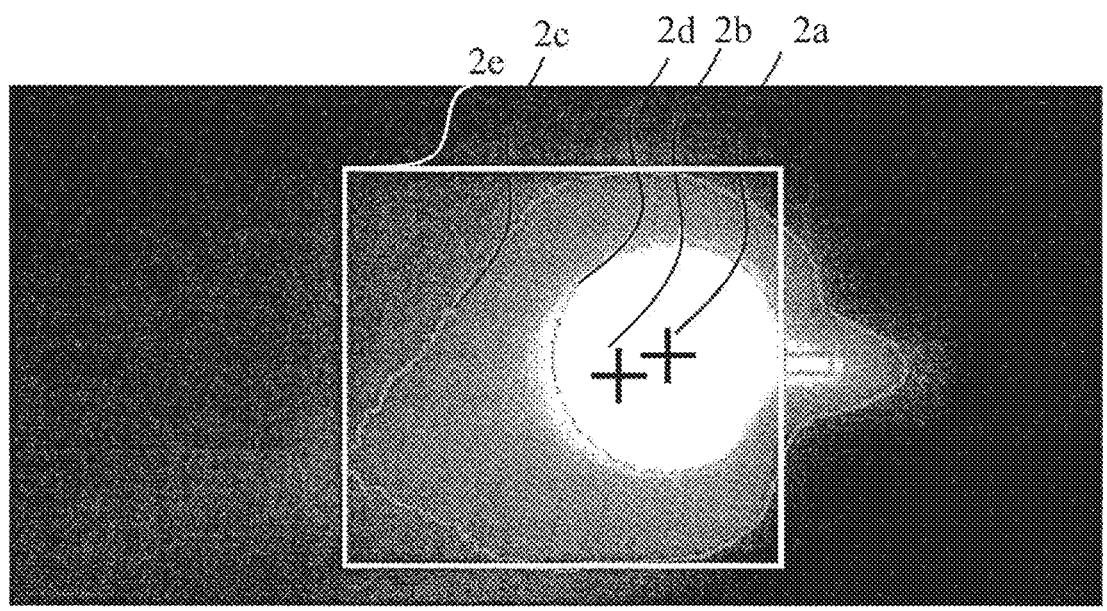
FIG. 4 shows a machining area of a workpiece during a laser machining process.

FIG. 4 shows an illustration of image data according to an embodiment. More precisely, FIG. 4 shows an exemplary image of the melt pool and the keyhole at 850 nm with superimposed geometry data. Cross 2a shows the center of the keyhole, cross 2b shows the center of the melt pool, line 2c shows the outline of the melt pool and line 2d shows the outline of the keyhole, as they are included as information in the output tensor determined a by the computing unit 320. The surrounding rectangle 2e ("bounding box") shows the calculated size of the melt pool.

In case of deviations from predetermined geometries or sizes of the melt pool, information indicating that the machining result of a laser machining process, for example a weld, is classified as "bad" may be contained in the output tensor. In this case, the system 300 for monitoring the laser machining process may output an error.

In conventional systems, target specifications or reference values for the size of the surrounding rectangle 2e would have to be specified or stored. A two-stage morphological operation ("blob analysis") is carried out for the calculation. The parameters required for this, such as the binary thresholds, must be specified by experts in conventional systems. With this approach, changes to the welding process require changes to the parameters by experienced experts. These disadvantages are avoided according to the monitoring system described herein.

Figure 5:
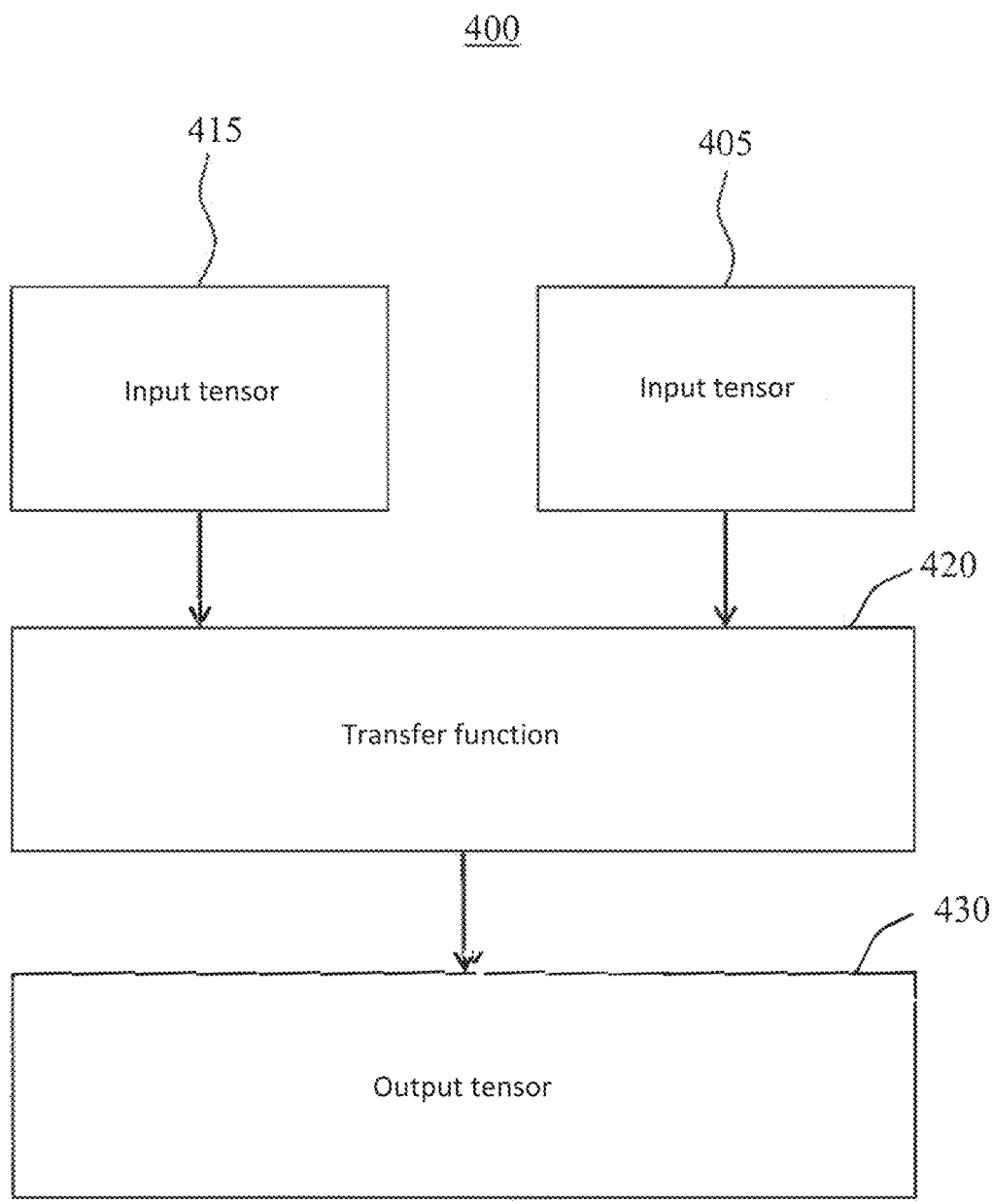
FIG. 5 shows a block diagram of a deep convolutional neural network according to an embodiment.

FIG. 5 shows a block diagram of a deep convolutional neural network 400 according to a first embodiment.

According to the embodiment shown in FIG. 5, the input tensors 405, 415 contain different types or kinds of sensor data, control data and image data of the laser machining system. For example, the input tensor 405 for the image data has the dimension "image height in pixels" x "image width in pixels" and the input tensor 415 for the sensor and/or control data has the dimension "number of types of sensor and/or control data" x "number of samples". Thus, the image data form the input tensor 405 for the "branch" of the neural network 400 which reduces the image data to the significant features. The sensor data form the input tensor 415 for the branch of the neural network 400 which calculates the significant features from the sensor data.

The sensor data may, for example, be temperatures measured by one or more temperature sensors, a plasma radiation measured by a corresponding sensor, an intensity of laser light reflected or backscattered on a workpiece surface measured by a photosensor, a wavelength of reflected or backscattered laser light, or a distance between a laser machining head and the workpiece measured by a distance sensor.

The control data may be control signals generated by a control in order to cause a laser machining system to carry out the laser machining process. The control data may include a focus position and a focus diameter of a laser beam or a path signal, said path signal representing a position signal which specifies the relative position of a laser machining head of the laser machining system relative to the workpiece.

The sensor data and/or control data directly form the input tensor 415 of the deep convolutional neural network. In the same way, the image data directly form the input tensor 405 of the deep convolutional neural network. This means that a so-called "end-to-end" mapping or analysis takes place between the input tensors 405 415 and the output tensor. Since image data and process data are classified in a network in this deep convolutional neural network, one speaks of a so-called "feature level fusion".

The computing unit may be configured to combine, for each of the points in time n, a set of sensor data, control data and/or image data corresponding to the respective point in time in the respective input tensors 405, 415 and to map it as a whole to the output tensor using the transfer function 420.

According to an embodiment, the detection rates of the image detection unit for detecting the image data and the sensor unit for detecting the sensor data may be the same, and the image detection unit and the sensor unit each carry out the detection at the same points in time.

The output tensor 430 and, accordingly, the output layer have a dimension corresponding to the information contained therein. The output tensor 430 contains, for example, at least one of the following information: presence of at least one machining error, type of the machining error, position of the machining error on a surface of a machined workpiece, probability of a machining error of a certain type, spatial and/or planar extent of the machining error on the surface of the machined workpiece, location and/or size of the keyhole, location and/or size and/or geometry of the melt pool.

The output tensor 430 may be forwarded to a control unit of the respective laser machining process (not shown). Using the information contained in the output tensor 430, the control unit can adapt the laser machining process, for example by adapting various parameters of the laser machining process.

The computing unit may be configured to form the output tensor 430 in real time. Thus, the laser machining process can be directly controlled using the system for monitoring a laser machining process described herein.

Figure 6:
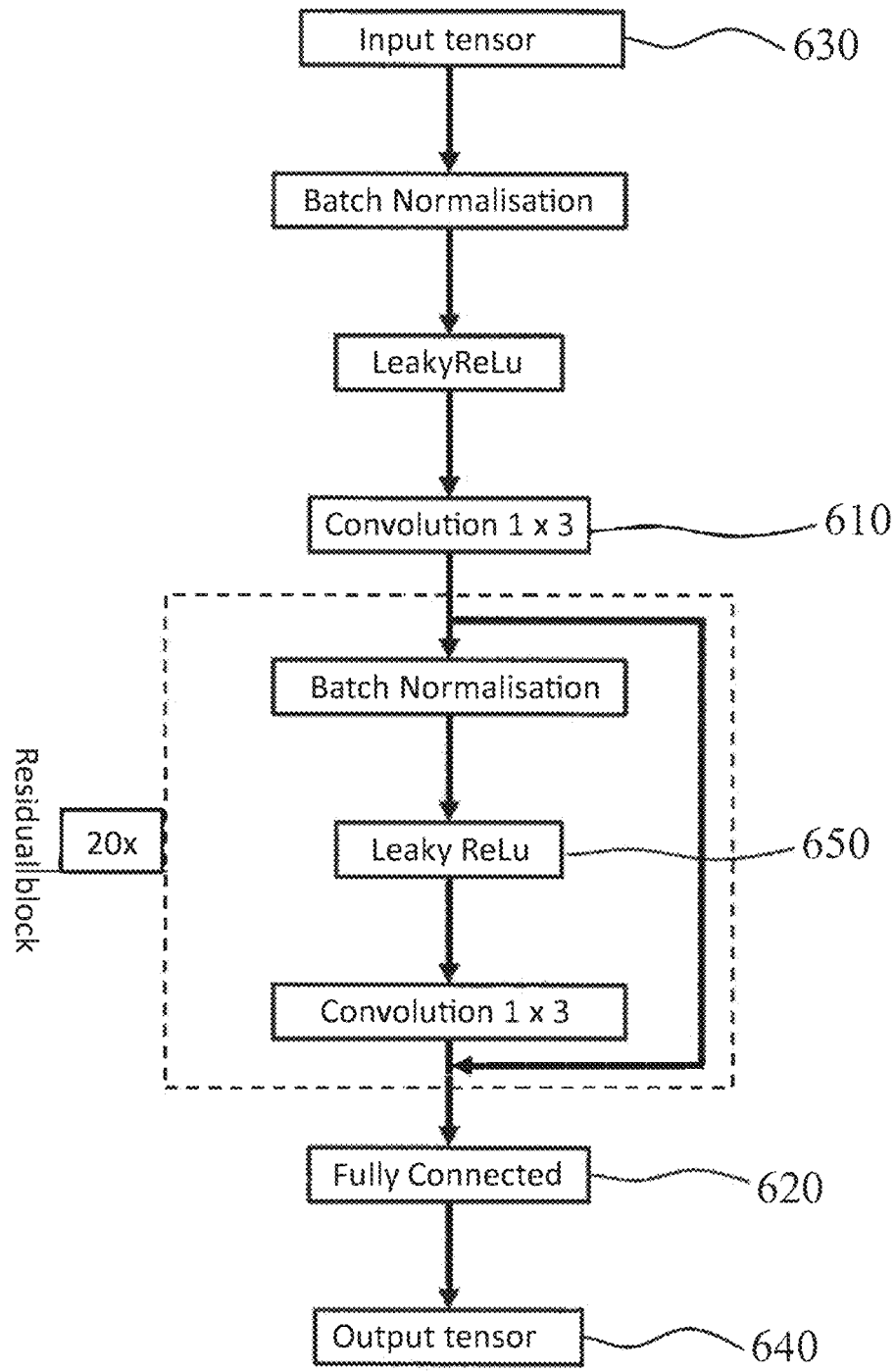
FIG. 6 shows a block diagram of a deep convolutional neural network for classifying process data according to an embodiment.

FIG. 6 shows a block diagram of a deep convolutional neural network 600 according to a further embodiment suitable for mapping an input tensor containing current sensor and/or control data to an output tensor.

According to the embodiment shown in FIG. 6, the input tensor 630 contains 512 measured values or samples of 4 different types of sensor data and/or control data, i.e. process data, of the laser machining system. The sensor data and control data directly form the input tensor 630 of the deep convolutional neural network. This means that a so-called "end-to-end" mapping or analysis takes place between the input tensor 630 and the output tensor 640.

The input layer or input tensor 630 thus has the dimension 4×512.

The transfer function formed by the deep neural network should contain information about a current monitoring error, that is to say a machining error that occurred at a point in time when the samples were taken. The output tensor 640 should, for example, contain the information "error yes/no", presence of or probability of error "hole", presence of or probability of error "splash", presence of or probability of "gap" error, presence of or probability of "false friend/lack of weld penetration" error. The output tensor 640 or the output layer thus has the dimension 1×5.

Accordingly, the deep convolutional neural network 600 according to the embodiment shown in FIG. 6 maps an input tensor 630 of dimension 4×512 to the output tensor 640 of dimension 1×5: $R^{2048} \to R^5$.

From the examination of the output tensor 640 or the values contained therein, the machined workpiece may in turn be classified as "good" or "bad" using a predefined classification algorithm. In other words, depending on the situation, the workpiece may be classified as suitable for sale or further machining ("good") or as scrap or marked for postmachining ("bad").

The deep convolutional neural network 600 ("Deep Convolutional Neural Net"), abbreviated to "CNN" in the following, may comprise a plurality of convolution layers 610 performing convolution with a plurality of cores. Furthermore, the CNN 600 may include a "fully connected" layer or block 620 and/or a "Leaky ReLu" block or layer 650. As shown in FIG. 6, the CNN comprises, for example, 21 convolution layers, with at least some convolution layers including a normalization (batch normalization) and residual blocks.

Figure 7:
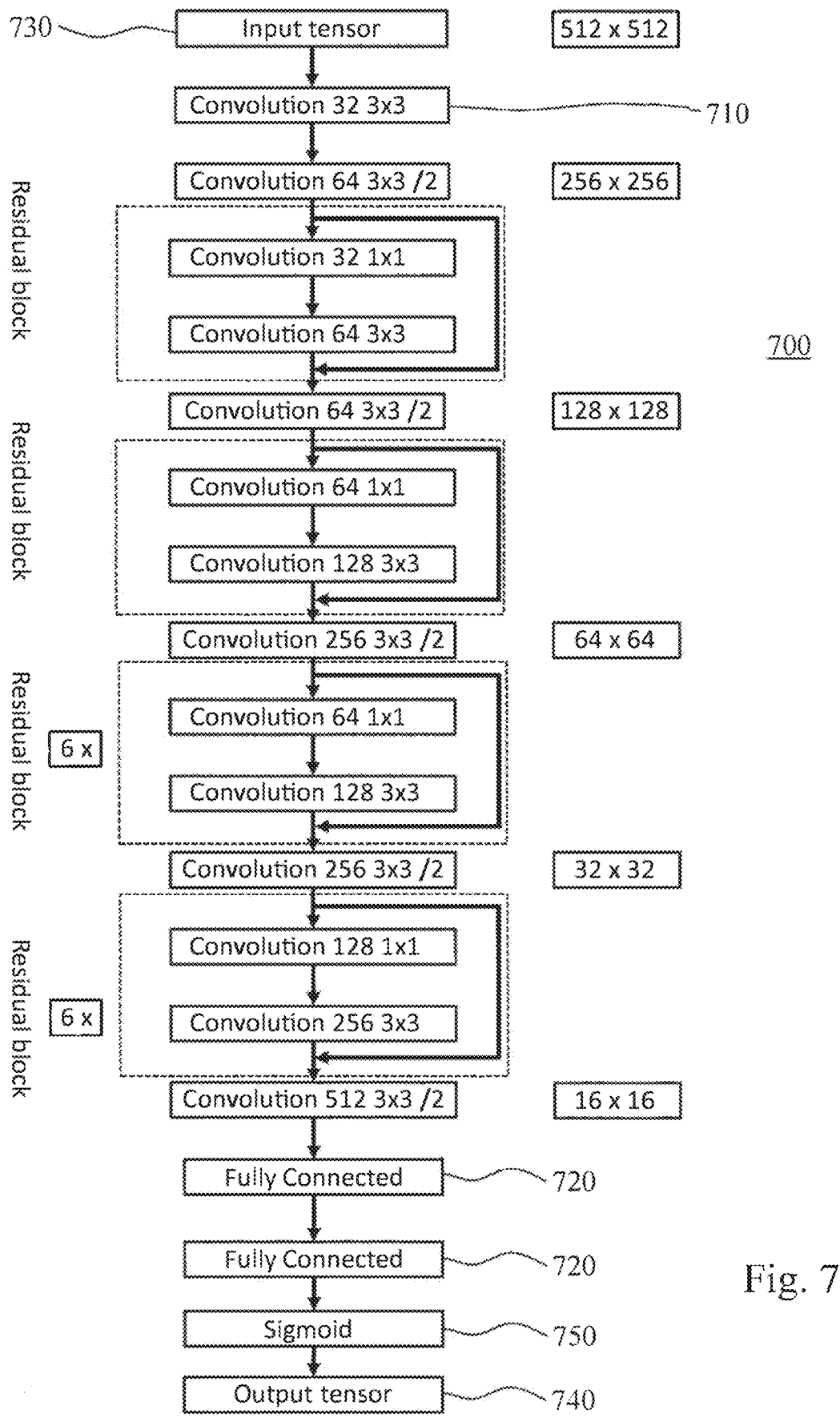
FIG. 7 shows a block diagram of a deep convolutional neural network for classifying image data according to an embodiment.

FIG. 7 shows a block diagram of a deep convolutional neural network 700 according to an embodiment which is suitable for mapping an input tensor comprising current image data to an output tensor.

In the case of the deep convolutional neural network 700 according to the embodiment shown in FIG. 7, the input tensor 730 comprises an image of the workpiece, for example of the machining area of the workpiece, with the size 512×512 pixels. That is, the input layer 730 has the dimensions 512×512.

The input tensor 730 contains the detected raw data of the image data. These raw image data directly form the input tensor of the deep convolutional neural network. This means that a so-called "end-to-end" mapping or analysis takes place between the input tensor 730 and the output tensor 740. Features of the keyhole or the melt pool are not calculated or parameterized in an intermediate step.

The transfer function is to provide information about whether the keyhole is present and/or information about the position of a center of gravity or center of the keyhole, about a rectangle surrounding the keyhole and/or about a rectangle surrounding the melt pool.

Thus, the output tensor 740 contains the values "Pkeyhole" (keyhole existing/not existing), "XKeyhole" (position of the center of gravity or center of the keyhole in the x direction), "YKeyhole" (position of the center of gravity or center of the keyhole in the Y-direction), "dXKeyhole" (size of the keyhole in the x-direction), "dYKeyhole" (size of the keyhole in the Y-direction), "Xmelt_pool" (position of the center of gravity or the center of the melt pool in the x-direction), "Ymelt_pool" (position of the center of gravity or center of the melt pool in the y direction), "dXmelt_pool" (size of the melt pool in the x direction), and "dYmelt_pool" (size of the melt pool in the y direction). The output tensor 740 or the output layer thus comprises 9 values and thus has the dimension 1×9.

Thus, according to the embodiment shown in FIG. 7, the neural network 700 maps the input tensor 730 of dimension 512×512 to the output tensor 740 of dimension 1×9: $R^{262144} \to R^9$.

As shown in FIG. 7, the CNN comprises, for example, 34 convolution layers 710, with at least some convolution layers comprising a normalization ("batch normalization") and so-called residual blocks. The convolution network also has two so-called "fully connected" layers 720. The neural network 700 is serialized in the last layer 750 and mapped to the output tensor 740 by means of a sigmoid activation function.

By normalizing the outputs of a layer, the problem of "exploding" or "vanishing" gradients can be avoided. The behavior in the inference process is less sensitive to data of other distributions.

The normalization usually includes the mean value and the standard deviation over a "mini batch". The effect thereof is regulation.

According to an embodiment, these parameters are used as hyperparameters in a trained deep convolutional neural network: "Batch Normalization", "Accelerating Deep Network Training by Reducing Internal Covariate Shift" (according to Sergey Ioffe, Christian Szegedy).

In FIG. 7, a "convolution 32 3×3" block represents a convolution block or a convolution layer with 32 different 3×3 convolution filter masks. That is, the block "convolution 32 3×3" generates a tensor of dimension m×n×32 from an input tensor 730 of dimension m×n×c, where m represents the height, n the width, c the number of channels. In the case of a single-channel (c=1) input tensor with height m=512 and width n=512, an output tensor 740 of dimension 512×512×32 is formed, so that the output tensor contains 32 images of dimension 512×512. The same applies to other convolution blocks.

The indication "/2" in a convolution block in FIG. 7 describes a "stride" of 2. That is, the filter core is shifted forward by 2 pixels so that the dimension is reduced by half. The information above the blocks, e.g. "512×512", describes the dimension m×n of the tensor without the number of channels.

The indication "residual block" specifies that the output of a previous layer (l) is added to the result of an output layer (l+2) before the value is passed on via the activation function.

Figure 8:
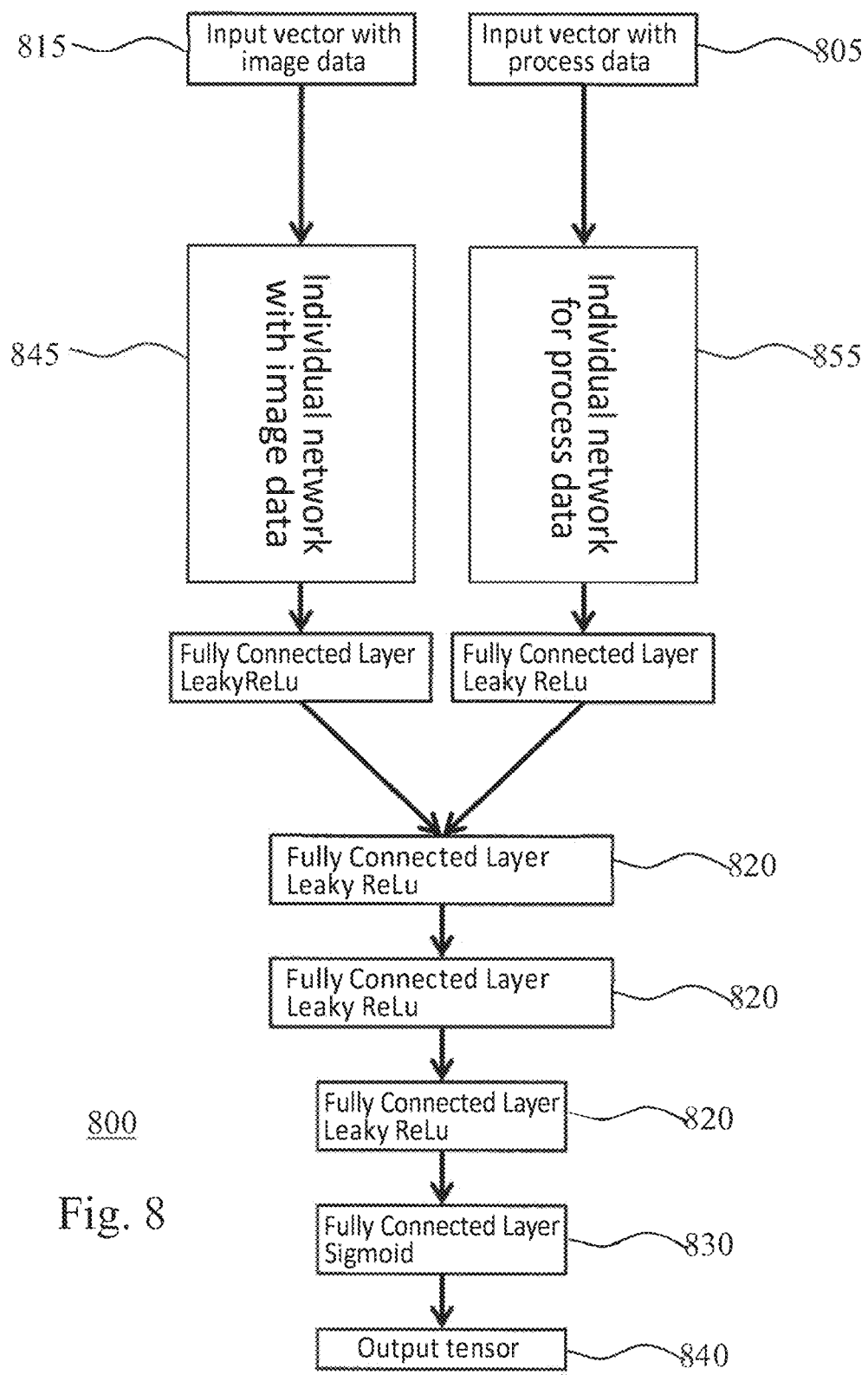
FIG. 8 shows a block diagram of a deep convolutional neural network for classifying image and process data according to an embodiment.

FIG. 8 shows a deep convolutional neural network for classifying image data and process data. According to an embodiment, the neural network 800 comprises a neural network 845, 855 according to the embodiments of FIGS. 6 and 7. In this case, the neural network 800 is created by chaining or coupling or linking at least one fully connected layer 830 and optionally further fully connected layers 820 with what is known as a "Leaky ReLu" activation function. The mapping of the last fully connected layer 830 to the output tensor 840 can be carried out by means of a sigmoidal activation function. The two input tensors 805, 815 of the respective neural networks 845, 855 are mapped to the output tensor 840, the output tensor 840 having the following components: P (error), P (hole), P (spatter), P (gap), P (false friend), "x_keyhole", "y_keyhole", "dx_keyhole", "dy_keyhole", "x_melt_pool", "y_melt_pool", "dx_melt_pool" and "dy_melt_pool". P stands for the probability of a machining error of a certain type. The output tensor 840 of the neural network 800 thus has the dimension 1×13.

The neural network used in the embodiments of FIGS. 5 to 8 is a trained or taught deep convolutional neural network. In other words, before delivery of the system for detecting machining errors, the CNN learned from examples which is a "good" and which is a "bad" machined workpiece surface or which is a "good" and a "bad" welding or solder or weld seam. In other words, the CNN has learned to classify a machined workpiece surface as "good" or "bad" or it has learned to detect machining errors, to localize them, to classify them according to their type and to determine their size.

In the case of in-process monitoring, the system is to reliably determine whether the machined workpiece surface has machining errors or which geometric properties the machining area has. It can preferably detect which errors are present (e.g. a pore, a hole, ejection, spatter, adhesion or a lack of weld penetration or "false friend") and can possibly also localize the machining error and indicate its size on the workpiece surface. In order to train the CNN and set the hyperparameters, input data sets and corresponding output tensors are provided to the CNN. The specified input data sets contain, for example, sensor, image and/or control data of the laser machining process as described above. A corresponding predetermined output tensor or result tensor is associated with each predefined input data set. This output tensor contains the desired result of the CNN for the respective laser machining process for the respective input data set.

In order to train the network for image and process data according to the embodiment described in FIG. 8, individual networks for image data and process data are used. After training, the last fully connected layers contain the representation of the significant features. With the parameters of the respective individual networks determined in this way, the networks are chained as described and only the layers after the chaining are trained.

In other words, the corresponding predetermined output tensor contains information about the classification of the machining errors present on the section of the machined workpiece surface and/or about the geometric features of the machining area. This mapping of an output tensor to each given input data set is carried out manually (so-called "labeling" of the detected sensor, image and control data). That is, a predetermined mapping of the sensor, image and control data to the result of the transfer function takes place. For example, it is specified in the output tensor whether a machining error has occurred in a laser machining process used as a basis for the input data set, what type of error is present, at what location on the machined workpiece surface the machining error is present, for example using a two-dimensional coordinate system with x and y coordinates, and the size of the machining error in the x and y directions, whether a keyhole and/or a melt pool is present, where the keyhole and/or the melt pool are with respect to each other or to a current machining point, which area and/or which semi-axes the keyhole and/or the melt pool have, etc.

Then, the transfer function formed by the CNN is determined by means of an optimization method and stored in the system 300, preferably in the memory of the computing unit 320. The optimization process is carried out, for example, with the "backpropagation" process with an Adam optimization. For inference, the CNN provides the mapping of the input data set to the machining result.

According to an embodiment, the following parameters are used as hyperparameters in the trained network: "Batch Normalization", "Accelerating Deep Network Training by Reducing Internal Covariate Shift" (according to Sergey Ioffe, Christian Szegedy).

The taught deep folding neural network is configured in such a way that it can be adapted to a changed situation or to a changed laser machining process by means of so-called transfer learning. The basic training of the network is carried out in advance of the commissioning of the system. In the event of changes to the machining process after commissioning, only what is known as transfer learning is carried out. The changed situation may be, for example, that the workpieces to be machined change, e.g. when the material changes. The thickness of the workpiece surface or the material composition may also change slightly. In addition, other process parameters may be used for machining the workpiece. This can cause other machining errors. For example, the probability of the different types of machining errors may change or the machining errors may be formed differently. This means that the neural network must be adapted to the changed situation and the resulting change in machining errors.

The transfer learning proceeds similar to the initial teaching of the neural network. Typically, however, only a few specific convolution layers of the deep convolutional neural network are adapted in transfer learning, in particular the last two to three convolution layers. The number of parameters of the neural network that are changed is significantly less than when training or teaching the neural network. This allows for the transfer learning to be completed quickly at the customer, typically in less than an hour. This means that for transfer learning, not the entire neural network is retrained or retaught.

The system 300 may receive the training data required for transfer learning via the interface 321.

The training data may include test data sets of the changed laser machining process from which the computing unit forms a corresponding input tensor during transfer learning. In addition, the training data include a predetermined output tensor which is associated with the respective test data set and contains information about a corresponding machining result of the changed laser machining process previously determined by an expert.

For example, the test data sets contain sensor data that were detected when a machining error occurred during a previous laser machining process, and the associated output tensor contains information about the error, for example the type of error, the position and the extent of the machining error on the workpiece.

Figure 9:
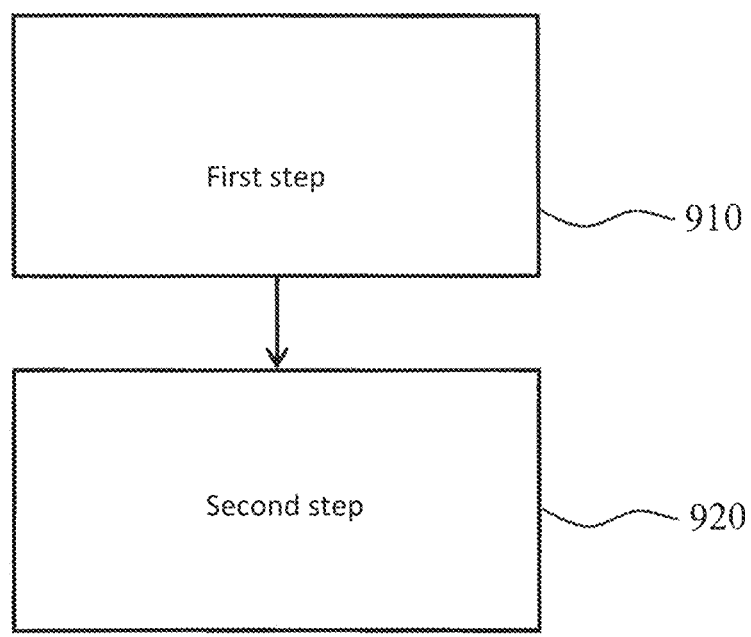
FIG. 9 shows a method for monitoring a laser machining process for machining a workpiece according to an embodiment.

FIG. 9 shows a method for monitoring a laser machining process for machining a workpiece. The first step 910 comprises determining an input tensor based on current data from the laser machining process. In a second step 920, an output tensor is determined based on the input tensor using a transfer function, said output tensor containing information about a current machining result. The transfer function is predetermined and formed by a taught neural network.

The method for monitoring a laser machining process can be carried out while the workpiece is being machined. According to an embodiment, the method runs through the entire machined workpiece surface once.

The use of a neural network forming the transfer function has the advantage that the system can independently detect whether and which machining errors are present. Accordingly, it is no longer necessary for the received current data, such as the image or sensor data, to be preprocessed in order to be accessible for error detection. Furthermore, it is not necessary to extract features characterizing the processing quality or any machining errors from the detected data. In addition, it is not necessary to decide which extracted features are necessary or relevant for the assessment of the machining quality or the classification of the machining errors. It is also not necessary to specify or adapt a parameterization of the extracted features for classifying the machining errors. The determination or assessment of the machining quality or the machining errors by the laser machining system is thereby simplified. The steps mentioned do not have to be carried out or attended by experts in laser machining.

The invention claimed is:

1. A system for monitoring a laser machining process for machining a workpiece, comprising:
   a computing unit configured to determine an input tensor based on current data of the laser machining process and to determine an output tensor based on the input tensor using a transfer function, the output tensor containing information about a current machining result;
   wherein said transfer function between the input tensor and the output tensor is formed by a taught neural network,
   wherein:
   the taught neural network comprises an individual network for process data and an individual network for image data, which are coupled at least via a common output layer, wherein the network for process data and the network for image date are separated networks; and
   the taught neural network is configured to map an input tensor for process data and an input tensor for image data to a common output tensor, and
   wherein the at least one output layer comprises at least one fully connected layer,
   wherein the individual network for process data has fewer layers than the individual network for image data.

2. The system according to claim 1, wherein:
   the current data of the laser machining process comprise current image data and/or current process data of the laser machining process; and
   the current process data comprise current sensor data and/or current control data.

3. The system according to claim 1, wherein the input tensor includes or consists of current data of the laser machining process as raw data.

4. The system according to claim 1, wherein the current data of the laser machining process include at least one of the following: a temperature, a plasma radiation, a laser power, an intensity of reflected or backscattered laser light, a wavelength of reflected or backscattered laser light, a distance of the laser machining head carrying out the laser machining process to the workpiece, a keyhole depth, a focus position, a focus diameter, a path signal, and/or an image of a surface of the workpiece.

5. The system according to claim 1, further comprising at least one sensor unit for detecting current sensor data of the laser machining process during the laser machining process; and/or
   an image detection unit for detecting current image data of a machining area of said workpiece during the laser machining process.

6. The system according to claim 1, wherein the input tensor for process data is based on a plurality of samples and the input tensor for image data comprises an image, said image temporally corresponding to the samples of the input tensor for process data.

7. The system according to claim 1, wherein the machining result includes information about a machining error and/or a machining area of said workpiece.

8. The system according to claim 1, wherein the output tensor contains one of the following pieces of information: presence of at least one machining error, type of the machining error, position of the machining error on a surface of a machined workpiece, probability of a machining error of a certain type, and spatial and/or planar extent of the machining error on the surface of the machined workpiece.

9. The system according to claim 1, wherein said computing unit is configured to form the output tensor in real time and to output control data to a laser machining system performing the laser machining process.

10. The system according to claim 1, wherein the taught neural network can be adapted to a changed laser machining process by means of transfer learning based on training data.

11. The system according to claim 10, wherein the training data comprise:
    test data of the changed laser machining process for determining a corresponding input tensor; and
    a predetermined output tensor which is associated with the respective test data and contains information about a corresponding previously determined machining result of the changed laser machining process.

12. A laser machining system for machining a workpiece by means of a laser beam, said laser machining system comprising:
    a laser machining head for radiating a laser beam onto a workpiece to be machined; and
    a system according to claim 1.

13. A system for monitoring a laser machining process for machining a workpiece, comprising:
    a computing unit configured to determine an input tensor based on current data of the laser machining process and to determine an output tensor based on the input tensor using a transfer function, the output tensor containing information about a current machining result;
    wherein said transfer function between the input tensor and the output tensor is formed by a taught neural network,
    wherein:
    the taught neural network comprises an individual network for process data and an individual network for image data, which are coupled at least via a common output layer, wherein the network for process data and the network for image date are separated networks; and
    the taught neural network is configured to map an input tensor for process data and an input tensor for image data to a common output tensor, and
    wherein the at least one output layer comprises at least one fully connected layer,
    wherein the individual network for process data has fewer convolution layers than the individual network for image data.

14. A system for monitoring a laser machining process for machining a workpiece, comprising:

a computing unit configured to determine an input tensor based on current data of the laser machining process and to determine an output tensor based on the input tensor using a transfer function, the output tensor containing information about a current machining result;

wherein said transfer function between the input tensor and the output tensor is formed by a taught neural network, wherein:

the taught neural network comprises an individual network for process data and an individual network for image data, which are coupled at least via a common output layer, wherein the network for process data and the network for image date are separated networks; and the taught neural network is configured to map an input tensor for process data and an input tensor for image data to a common output tensor, and wherein the at least one output layer comprises at least one fully connected layer, wherein the individual network for process data has fewer residual blocks than the individual network for image data.

* * * * *